US 6,659,818 B2

(12) United States Patent
Booe

(10) Patent No.: US 6,659,818 B2
(45) Date of Patent: Dec. 9, 2003

(54) SHOCK-ABSORBING PROPELLER ASSEMBLY

(75) Inventor: James Booe, Indianapolis, IN (US)

(73) Assignee: Precision Propeller, Inc., Indianapolis, IN (US)

( * ) Notice: Subject to any disclaimer, the term of this patent is extended or adjusted under 35 U.S.C. 154(b) by 0 days.

(21) Appl. No.: 10/074,894

(22) Filed: Feb. 13, 2002

(65) Prior Publication Data
US 2003/0153218 A1 Aug. 14, 2003

(51) Int. Cl.$^7$ ................................................ B63H 23/34
(52) U.S. Cl. ........................ 440/83; 440/52; 416/93 A; 416/134 R
(58) Field of Search .............................. 440/52, 53, 75, 440/76, 78, 83; 416/93 A, 134 R, 245 A, 244 R, 170 R; 464/89, 182

(56) References Cited

U.S. PATENT DOCUMENTS

| | | | | |
|---|---|---|---|---|
| 4,566,855 A | * | 1/1986 | Costabile et al. | 416/134 R |
| 4,642,057 A | | 2/1987 | Frazzell et al. | 440/52 |
| 4,842,483 A | * | 6/1989 | Geary | 416/93 A |
| 5,049,034 A | * | 9/1991 | Cahoon | 416/134 R |
| 5,908,284 A | * | 6/1999 | Lin | 416/134 R |
| 5,967,751 A | * | 10/1999 | Chen | 416/93 A |
| 6,471,481 B2 | * | 10/2002 | Chen | 416/134 R |
| 6,524,069 B2 | * | 2/2003 | Chen | 416/134 R |

* cited by examiner

Primary Examiner—S. Joseph Morano
Assistant Examiner—Lars A. Olson
(74) Attorney, Agent, or Firm—Barnes & Thornburg

(57) ABSTRACT

A method and apparatus is disclosed for connecting a drive axle to a propeller. A drive member is configured to mount on a drive axle, a tubular member is coupled to the propeller, and a resilient member is configured to be positioned between the drive member and the tubular member. The drive member has an axis and includes a plurality of radially outwardly extending tabs. The tubular member is coupled to the propeller and has an axis and a plurality of radially inwardly extending tabs. The resilient member has an axis and is configured to be positioned between the outwardly extending tabs and the inwardly extending tabs. Furthermore, the resilient member is mounted coaxially with the drive member and the tubular member.

20 Claims, 4 Drawing Sheets

SHOCK-ABSORBING PROPELLER ASSEMBLY

BACKGROUND AND SUMMARY

The present invention relates to a marine propeller, and particularly, to an arrangement and method for mounting a marine propeller on a propeller shaft. More particularly, the present invention relates to a shock absorbing system for a marine propeller that is mounted on a propeller shaft.

According to the disclosure, an assembly is provided for connecting a propeller to a drive axle. The assembly comprises a drive member configured to mount on the drive axle, a tubular member coupled to the propeller, and a resilient member configured to be positioned between the drive member and the tubular member. The drive member has an axis and includes a plurality of radially outwardly extending tabs. The tubular member is coupled to the propeller and has an axis and a plurality of radially inwardly extending tabs. The resilient member has an axis and is configured to be positioned between the outwardly extending tabs and the inwardly extending tabs. Furthermore, the resilient member is mounted coaxially with the drive member and the tubular member.

A method of resiliently connecting a drive axle to a propeller is disclosed, the method comprising the steps of providing a drive member configured to mount on the drive axle, positioning a single-piece resilient member over the drive member, and positioning a propeller over the resilient member. The drive member is defined to have an axis and include a plurality of radially outwardly extending tabs. The single-piece resilient member is configured to have a portion of the resilient member disposed between each of the plurality of radially outwardly extending tabs. The propeller has a concentric tubular member defining an axis and a plurality of radially inwardly extending tabs. Each of the radially inwardly extending tabs is configured to extend between portions of the resilient member.

According to the disclosure, the resilient member is formed to deflect under torsion delivered by either the propeller or the drive member. The resilient member also permits limited movement of the propeller relative to the drive member.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
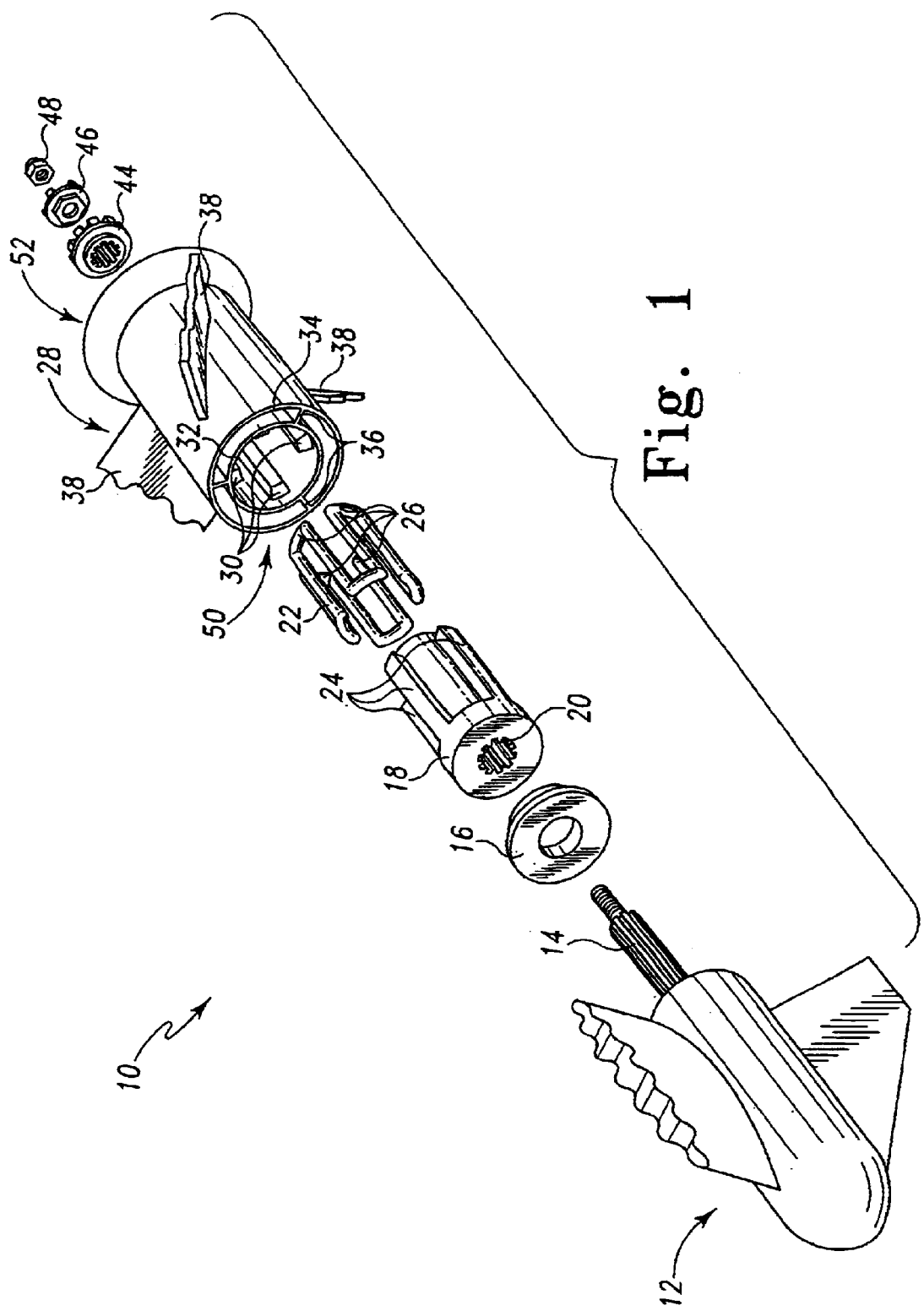
FIG. 1 is an exploded view of a propeller assembly constructed according to one embodiment of the present disclosure.

Propeller assembly 10 comprises an outboard lower drive unit 12, from which a splined propeller shaft 14 extends, as shown in FIG. 1. Propeller shaft 14 is operatively connected to a power source, such as a motor (not shown), which causes shaft 14 to rotate about its axis, thereby applying propulsive power to the propeller 28.

Figure 2:
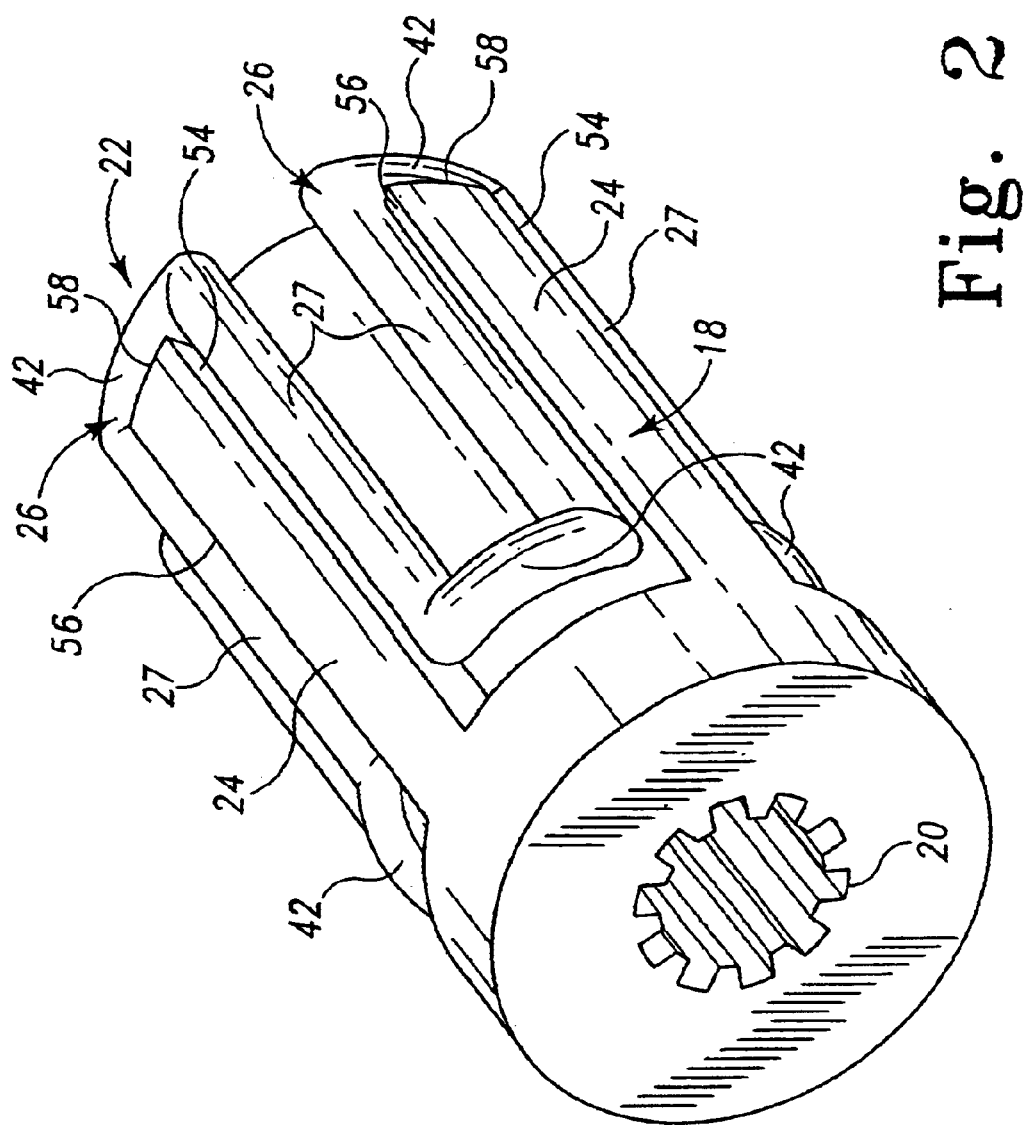
FIG. 2 is a perspective view of the resilient member fitted over a sleeve drive member.

In the illustrative embodiment shown in FIG. 1, washer 16 is positioned concentrically on propeller shaft 14 and adjacent lower drive unit 12. A sleeve drive member 18 having a splined central bore 20 is positioned adjacent washer 16, and resilient member 22 is fitted over sleeve drive member 18. Illustratively, sleeve drive member 18 is formed to include four radially outwardly and longitudinally extending tabs 24. Resilient member 22 is formed in a serpentine manner such that four end or looped portions 26 encompass the sides of tabs 24, as shown in FIG. 2. It should be understood, however, that this disclosure contemplates the use of any number of radially extending tabs 24 and looped portions 26.

FIG. 2 shows resilient member 22 positioned on sleeve drive member 18. Resilient member 22 includes looped portions 26, which are configured to fit around radially extending tabs 24. Resilient member 22 is configured such that two circumferentially spaced apart elongated portions 27 are disposed between each tab 24. Tabs 24 each illustratively include a first side wall 54 along which elongated portion 27 of resilient member 22 extends, and a second side wall 56 along which another elongated portion 27 extends. Tabs 24 each also include an end wall 58 along which end member 42 of resilient member 22 extends.

Resilient member 22 is illustratively molded from a urethane or rubber material, but may be constructed from any pliable or resilient material known in the art. In the illustrative embodiment, the rubber is formulated to have a hardness in the range of, but not limited to, 30 to 100 durometer on the Shore A-scale. Resilient member 22 is illustratively shown to have elongated portions 27 and end members 42 that are substantially cylindrically shaped. However, it is within the scope of the disclosure to form the elongated portions 27 and end members 42 into any shape, including a polygon, square, triangle, or oval, and may include rounded edges.

As illustratively shown in FIG. 1, propeller 28 is configured to have four radially inwardly and longitudinally extending tabs 30 fixed to its inner hub 32. Again, it is contemplated that any number of inwardly extending tabs 30 is within the scope of this disclosure. Inner hub 32 and outer hub 34 are connected with spokes 36. Outer hub 34 carries propeller blades 38. When propeller 28 is mounted on sleeve drive member 18 with resilient member 22 positioned therebetween, each tab 30 of propeller 28 is interposed between two sleeve drive member tabs 24. In the illustrative embodiment, an elongated portion 27 (illustrated best in FIGS. 2 and 3) of resilient member 22 passes between each propeller tab 30 and drive member tab 24, as can be further understood by referencing the cross-sectional view shown in FIG. 4.

Propeller 28 is secured to the propeller assembly in any manner known in the art, and is illustratively secured with splined washer 44, nut washer 46, and nut 48.

It should be understood that while the illustrated embodiment discloses an assembly order as shown in FIG. 1, wherein sleeve drive member 18 and resilient member 22 are inserted into propeller 28 from the bow end 50 of propeller 28, it is within the scope of the disclosure to modify the alignment and assembly order of sleeve drive member 18 and resilient member 22 such that they are inserted into the stern end 52 of propeller 28.

Figure 4:
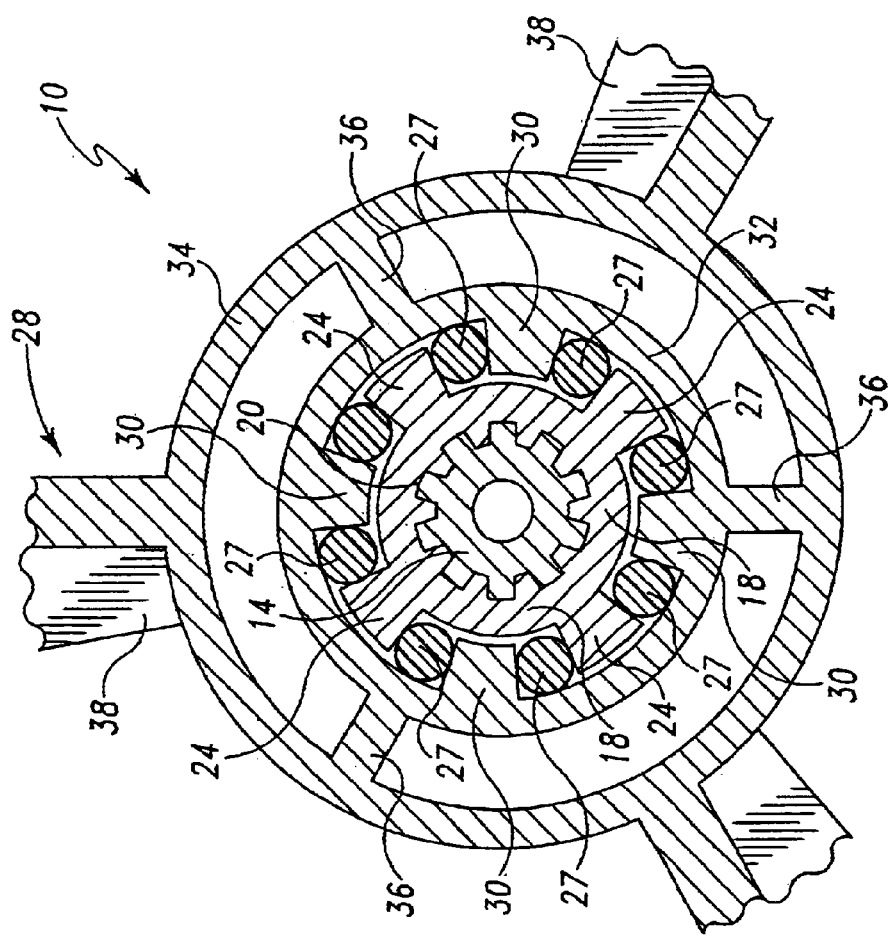
FIG. 4 is a cross-sectional view of the assembled propeller.

In the cross-sectional view shown in FIG. 4, the propeller assembly 10 is fully assembled in the order shown in FIG. 1, illustrating propeller 28 coupled through various components to propeller shaft 14. Sleeve drive member 18 is concentrically mounted on propeller shaft 14 such that splines on propeller shaft 14 are interlocked with splined central bore 20 of sleeve drive member 18. Resilient member 22 is positioned over sleeve drive member 18 as shown in FIG. 2, and propeller 28 is slidably inserted over resilient member 22 and sleeve drive member 18, thereby resulting in an elongated portion 27 of resilient member 22 being interposed between each propeller tab 30 and corresponding drive member tab 24. Illustratively, there exist twice the number of elongated portions 27 as propeller tabs 30 or drive member tabs 24.

As illustratively shown in FIG. 4, sleeve drive member 18 and drive member tabs 24 are formed such that a small clearance is provided between tabs 24 and inner hub 32 when propeller assembly 10 is assembled. Similarly, propeller tabs 30 are formed such that a small clearance is provided between tabs 30 and sleeve drive member 18. However, it is within the scope of the disclosure to have either of propeller tabs 30 or drive member tabs 24, or both, in direct contact with drive member 18 or inner hub 32, respectively. Direct contact between tabs 30 and drive member 18 or tabs 24 and inner hub 32 ensures the centering of propeller 28 on drive member 28.

Driving force, or torque, is transferred from sleeve drive member 18 through drive member tabs 24 to elongated portions 27 of resilient member 22. In turn, elongated portions 27 transfer the driving force to propeller tabs 30. Resilient member 22 is flexible and capable of absorbing compressive forces, thereby preventing damage that may otherwise result to various components when a driving force is directly transferred without an absorptive resilient member 22. Under extreme forces, resilient member 22 may even shear or fail in some manner.

In such a case, temporary or emergency use of propeller assembly 10 is still possible because propeller tabs 30 and drive member tabs 24 directly contact each other. Such a configuration allows the propeller assembly 10 to be operated even at high speeds after a resilient member failure, thereby allowing an operator to return to shore at faster than idle speeds. However, in such a scenario, the shock absorption qualities provided by resilient member 22 would be lost.

During normal operation, forces that may be encountered by propeller 28 are absorbed by resilient member 22. For example, if propeller 28 were to contact an object which would temporarily cause propeller 28 to hesitate, the resulting forces would be absorbed at least partially by resilient member 22 instead of being completely transferred to sleeve drive member 18 and other propeller assembly 10 components. The absorption of these forces by resilient member 22 can prevent permanent damage to components which make up propeller assembly 10 and even prevent damage to the motor which drives propeller shaft 14.

The present disclosure also contemplates and accommodates the forces that result from the shifting of gears. In larger boats with larger motors and/or larger propeller assemblies, the shifting of gears in the boat introduces forces or a shock to the propeller assembly 10 which could be damaging to any number of components. Resilient member 22 helps to absorb such forces, thereby preventing damage.

Figure 3:
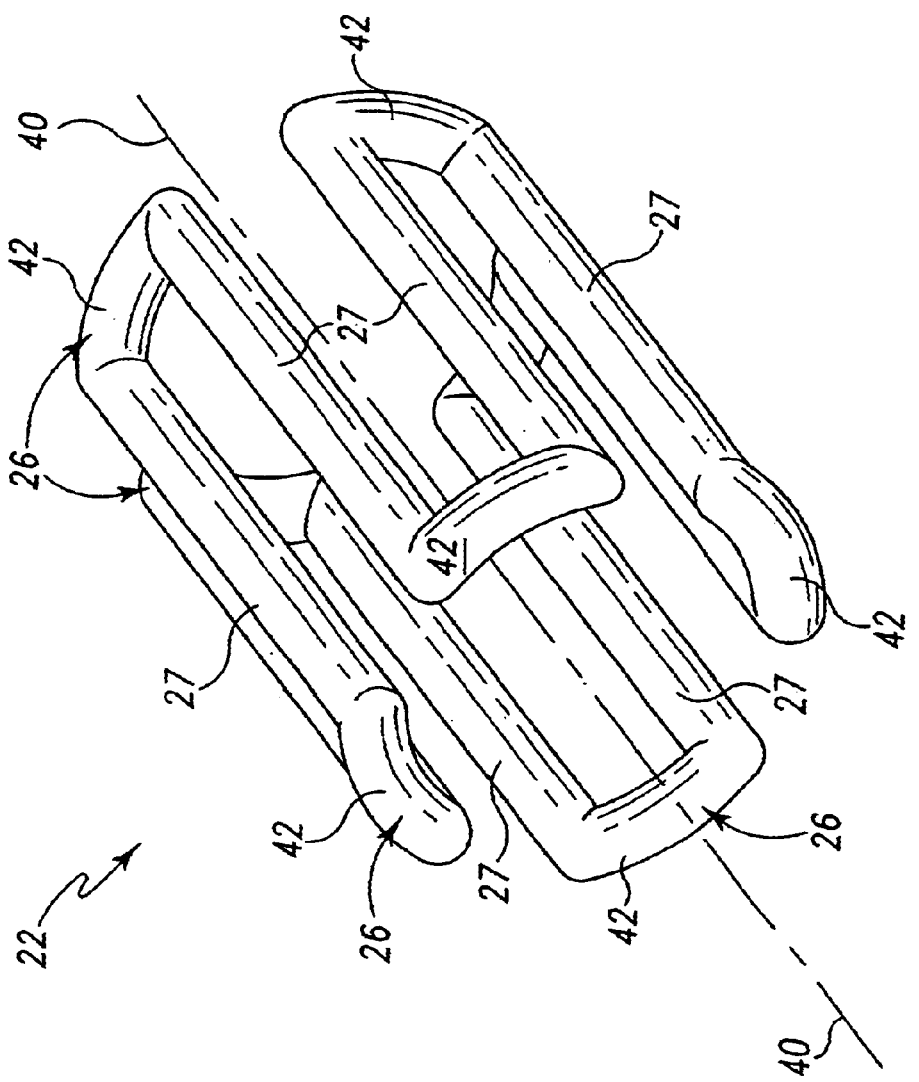
FIG. 3 is a perspective view of the resilient member.

Resilient member 22 can be seen in an enlarged view in FIG. 3. Resilient member 22 is formed to include looped portions 26 connected by elongated portions 27. Resilient member 22 defines a central axis 40 about which each of looped portions 26 and each of elongated portions 27 are equally spaced. Elongated portions 27 are axially arranged and substantially parallel to central axis 40. Illustratively, each of looped portions 26 includes an end member 42 that is arcuately formed about axis 40.

Elongated portions 27 and looped portions 26 substantially define a cylindrical shape formed about central axis 40. Although in the presently disclosed embodiment, elongated portions 27 and looped portions 26 are molded as a single piece, it is contemplated that such portions could be joined together after being formed individually. Advantageously, resilient member 22, in its final form, is a single piece that can be easily replaced and held in position on sleeve drive member 18 when service or replacement is required. Furthermore, resilient member 22 does not require press-fitting in order to install it in its proper place. In some prior art embodiments of a shock-absorbing coupling system, as much as eight tons of force was needed to press-fit a propeller on a shock-absorbing coupling system. The presently disclosed embodiment permits on-water service to be performed, eliminating the need for press-fitting tools and equipment.

A method of resiliently connecting a drive axle to a propeller is also disclosed. The method comprises the steps of providing a drive member configured to mount on the drive axle, positioning a single-piece resilient member over the drive member, and positioning a propeller over the resilient member. The drive member is defined to have an axis and include a plurality of radially outwardly extending tabs. The single-piece resilient member is configured to have a portion of the resilient member disposed between each of the plurality of radially outwardly extending tabs. The propeller has a concentric tubular member defining an axis and a plurality of radially inwardly extending tabs. Each of the radially inwardly extending tabs is configured to extend between portions of the resilient member.

According to the disclosure, the resilient member is formed to deflect under torsion delivered by either the propeller or the drive member. The resilient member also permits limited movement of the propeller relative to the drive member.

Although the invention has been described in detail with reference to preferred embodiments, additional variations and modifications exist within the scope and spirit of the invention as described and defined in the following claims.

What is claimed is:

1. An assembly for connecting a propeller to a drive axle, the assembly comprising
    a drive member configured to mount on the drive axle, the drive member having an axis and including a plurality of radially outwardly extending tabs, each tab having at least one surface aligned in a radial plane relative to the drive axle,
    a tubular member coupled to the propeller, the tubular member having an axis and a plurality of radially inwardly extending tabs, and
    a resilient member having an axis and configured to be positioned between the outwardly extending tabs and the inwardly extending tabs, the resilient member being mounted coaxially with the drive member and the tubular member.

2. The assembly of claim 1, wherein the drive member and the tubular member each has an equal predetermined number of the tabs, and the resilient member is configured to have twice that predetermined number of axially arranged portions, each portion being configured to be positioned between one of the outwardly extending tabs and one of the inwardly extending tabs.

3. The assembly of claim 1, wherein the resilient member has a plurality of elongated portions and a plurality of end portions connecting the elongated portions.

4. The assembly of claim 3, wherein each of the plurality of elongated portions is parallel with the resilient member axis.

5. The assembly of claim 3, wherein each of the plurality of elongated portions has an axial length that is substantially equal to the axial length of the inwardly extending tabs.

6. The assembly of claim 3, wherein each of the end portions is arcuately formed about the resilient member axis.

7. The assembly of claim 3, wherein the elongated portions and the end portions are substantially cylindrically shaped.

8. The assembly of claim 1, wherein the resilient member is configured to be fitted over the drive member.

9. An assembly for connecting a propeller to a drive axle, the assembly comprising
 a drive member configured to mount on the drive axle, the drive member having an axis and including a plurality of radially outwardly extending tabs, each tab having at least one surface aligned in a radial plane relative to the drive axle,
 a tubular member coupled to the propeller, the tubular member having an axis and a plurality of radially inwardly extending tabs configured to be in spaced relationship with the outwardly extending tabs to provide spaces therebetween, and
 a single-piece resilient member disposed between the drive member and the tubular member, the resilient member having portions configured to be positioned in the spaces between the plurality of outwardly extending tabs and inwardly extending tabs.

10. The assembly of claim 9, wherein the drive member and the tubular member have an equal predetermined number of tabs, and the resilient member is configured to have twice that predetermined number of axially arranged portions, each portion being configured to be positioned between one of the outwardly extending tabs and one of the inwardly extending tabs.

11. The assembly of claim 9, wherein the resilient member has a plurality of elongated portions and a plurality of end portions connecting the elongated portions.

12. The assembly of claim 11, wherein each of the plurality of elongated portions is parallel with the resilient member axis.

13. The assembly of claim 11, wherein each of the plurality of elongated portions is substantially the length of the inwardly extending tabs and the outwardly extending tabs.

14. The assembly of claim 11, wherein each of the plurality of end portions is arcuately formed about the resilient member axis.

15. The assembly of claim 11, wherein the elongated portions and the end portions are substantially cylindrically shaped.

16. The assembly of claim 9, wherein the resilient member is formed to be fitted over the drive member.

17. A method of resiliently connecting a propeller to a drive axle, the method comprising the steps of
 providing a drive member configured to mount on the drive axle, the drive member having an axis and including a plurality of radially outwardly extending tabs, each tab having at least one surface aligned in a radial plane relative to the drive axle,
 positioning a single-piece resilient member over the drive member, the single-piece resilient member being configured to have two circumferentially spaced apart portions of the resilient member disposed between each of the plurality of radially outwardly extending tabs, and
 positioning a propeller over the resilient member, the propeller having a concentric tubular member defining an axis and a plurality of radially inwardly extending tabs, wherein each of the radially inwardly extending tabs is configured to extend between two circumferentially spaced portions of the resilient member.

18. The method of claim 17, wherein the resilient member deflects under torsion delivered by one of the propeller and the drive member.

19. The method of claim 17, wherein the resilient member permits limited movement of the propeller relative to the drive member.

20. An assembly for connecting a propeller to a drive axle, the assembly comprising
 a drive member configured to mount on the drive axle, the drive member having an axis and including a selected number of radially outwardly extending tabs, each tab having at least one surface aligned in a radial plane relative to the drive axle,
 a tubular member coupled to the propeller, the tubular member having an axis and a number of radially inwardly extending tabs, the number of inwardly extending tabs being equal to the selected number of outwardly extending tabs, and
 a resilient member configured to be positioned between the drive member and the tubular member, the resilient member having a number of axially aligned portions and end portions connecting the axially aligned portions, wherein the number of axially aligned portions is equal to twice the number of outwardly extending tabs.

* * * * *